INVENTOR.
Maria Telkes
BY
ATTORNEY

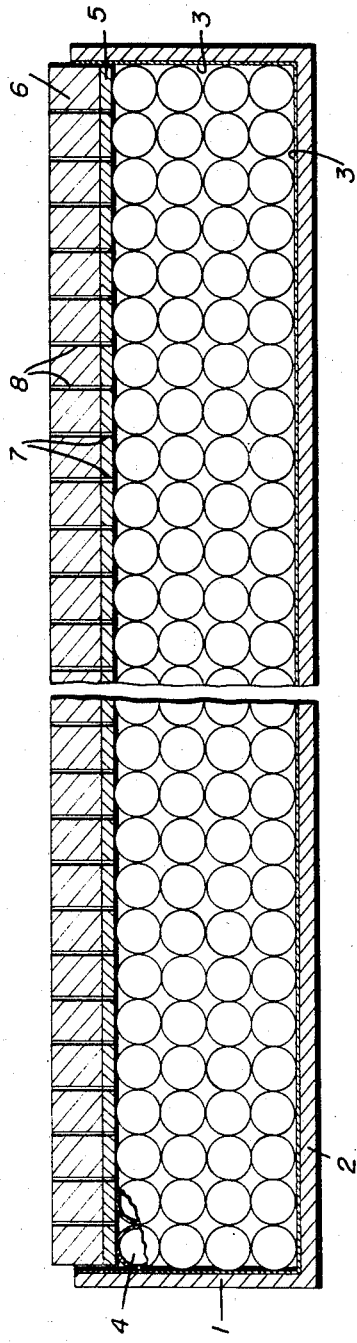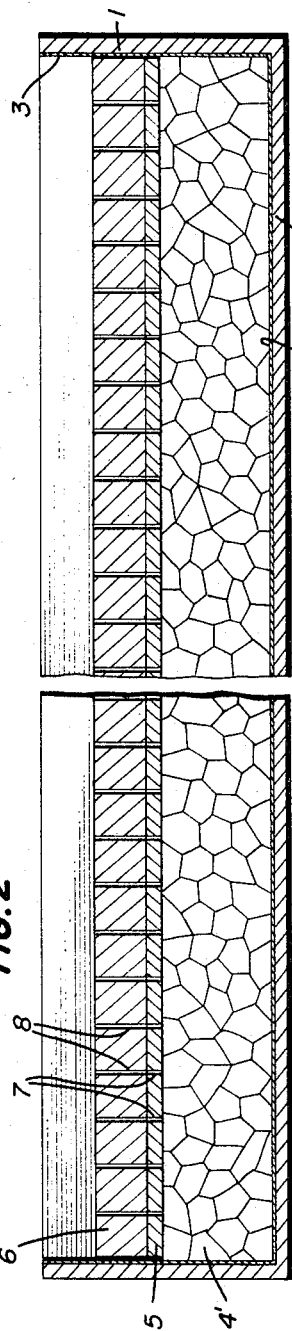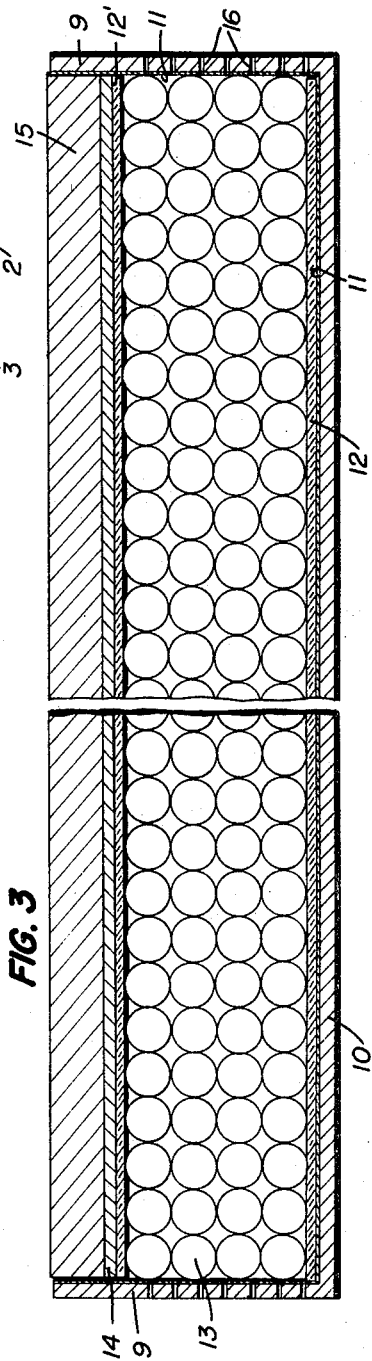

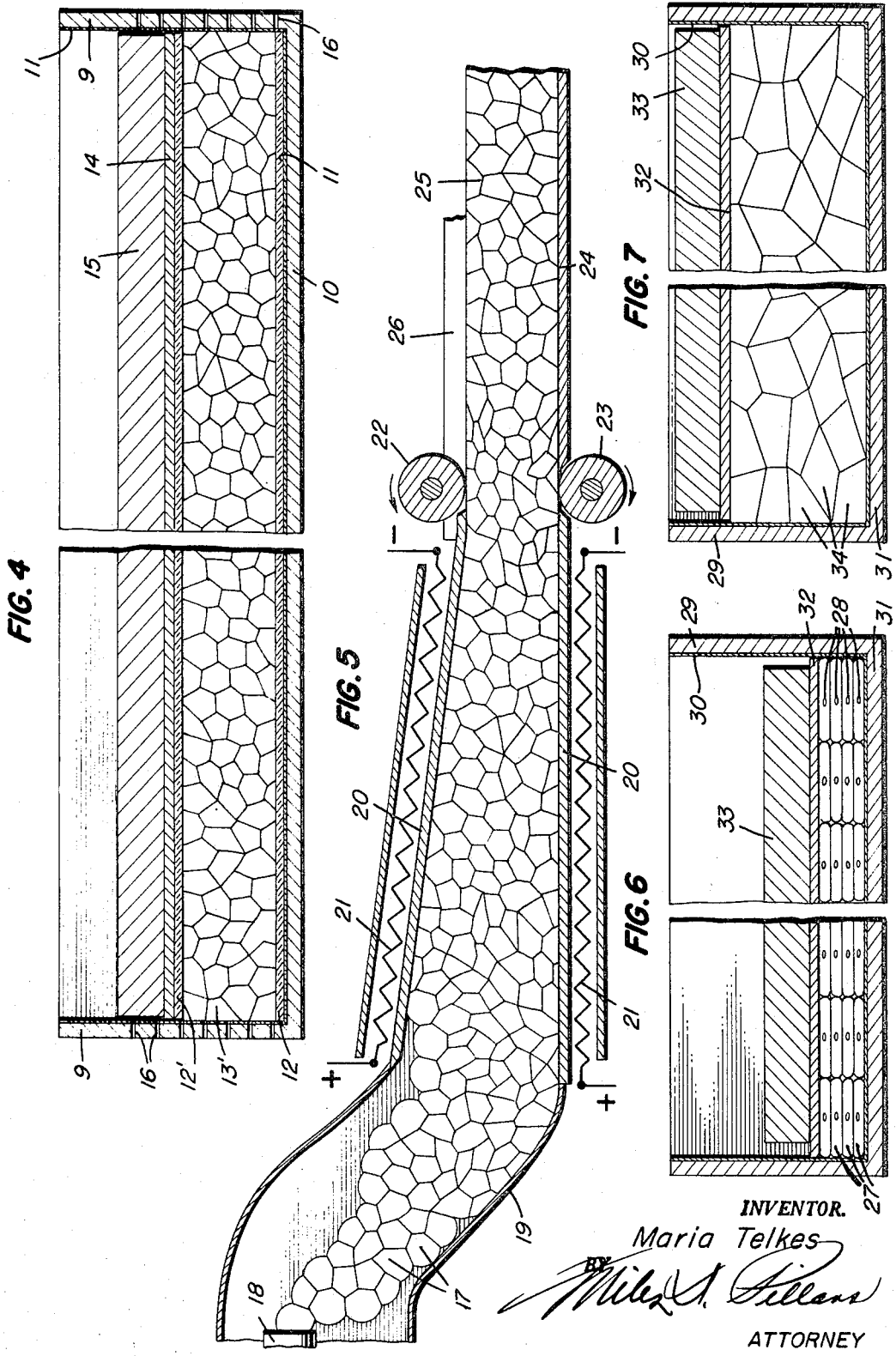

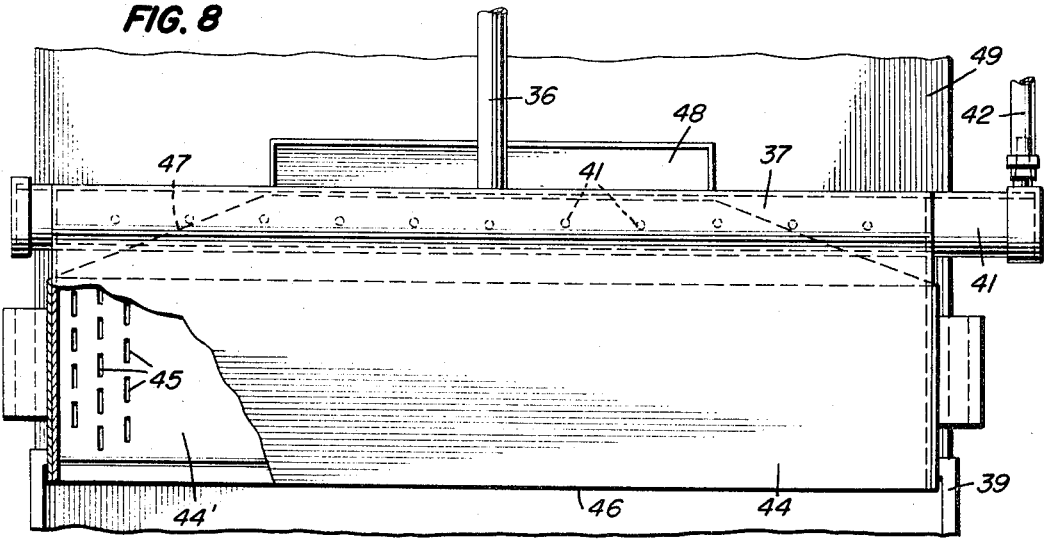
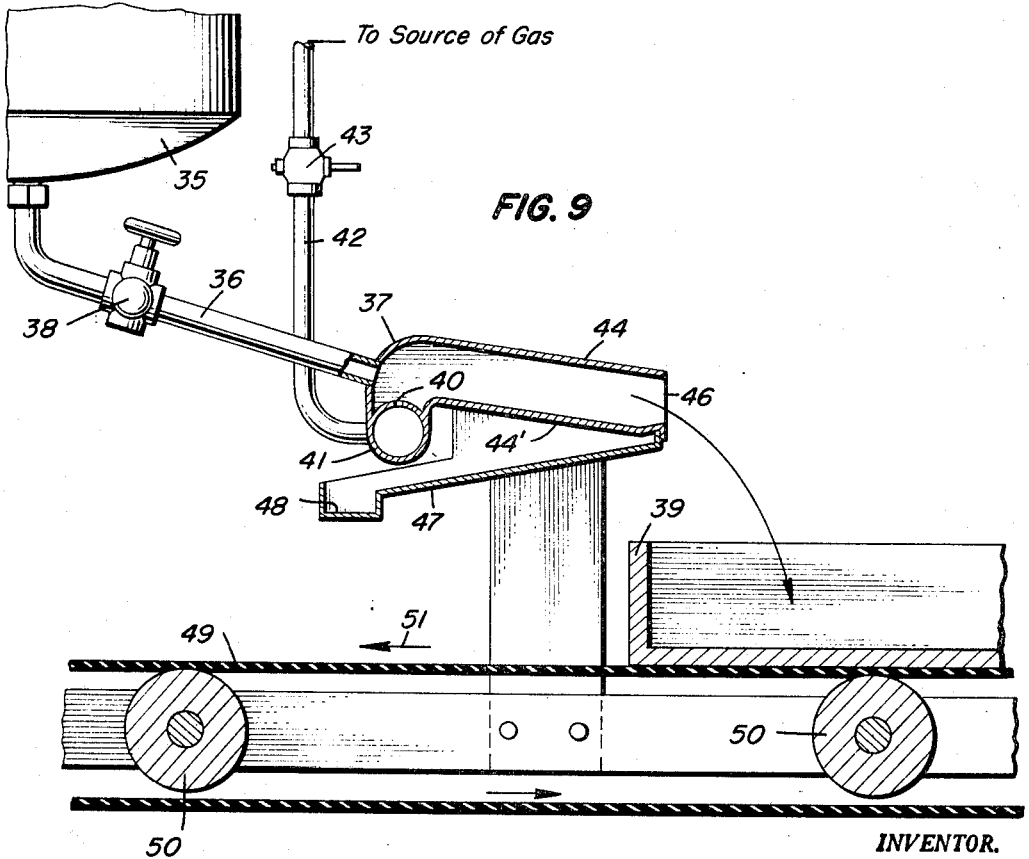

United States Patent Office 3,440,130
Patented Apr. 22, 1969

3,440,130
LARGE CELLED MATERIAL
Maria Telkes, Falls Church, Va., assignor to The Dow Chemical Company, Midland, Mich., a corporation of Delaware
Continuation-in-part of applications Ser. No. 3,181, Jan. 18, 1960, and Ser. No. 218,667, Aug. 22, 1962. This application Nov. 12, 1965, Ser. No. 516,190
Int. Cl. B44f 1/04; B32b 3/20, 5/18
U.S. Cl. 161—5                                      31 Claims

ABSTRACT OF THE DISCLOSURE

A light transmitting panel having a core of compacted hollow cells of light transmitting material. The cells have common walls and have a volume of a sphere having a diameter between one-fourth and three-fourths inch. The panel is highly transmissive of solar infrared waves and a good insulator of longer infrared waves.

This application is a continuation-in-part of application Ser. No. 3,181, for Large Celled Material, filed Jan. 18, 1960, now abandoned, and of application Ser. No. 218,667, for Method of Making Large Celled Material, filed Aug. 22, 1962, now Patent No. 3,248,464, both by the same applicant.

This invention relates to large celled material and particularly to panels of improved large celled substantially transparent materials, with or without skins or smooth relatively thin sheets on one or both sides of such panels.

In the past, many different types of panels have been made of foamed material, many of which include the addition of skins or sheets around the sides of the foamed material, either bonded thereto or simply as boundary layers for the foam core. In most instances the foam comprises material having voids dispersed throughout the material in a substantially uniform manner and surrounded by the bulk of the material. Where such foam is used for panel structures, it normally is formed of material which solidifies into a substantially rigid mass which can be molded prior to its solidification into the desired shape or can be trimmed or cut after it has solidified to provide the desired finished panel. Also, hollow beads of nontransparent materials have been used in the past for forming such panels, and, in some instances, nontransparent binders or fillers have been used as shown in U.S. Patents 2,758,937, Ford and 2,806,509, Bozzacco et al.

Nucleated or very small celled polystyrene or similar foam often is used in making rigid panel structures. Such foam has the disadvantage of being substantially opaque unless very thin layers are used and therefore does not transmit any substantial amount of light or any substantial amount of short wave infrared radiation. It has the advantage of being a fairly good insulating material. For many uses, it is desirable to have relatively lightweight light-transmitting and short wave infrared radiation transmitting panels, which also are good long wave heat insulators.

According to the present invention, panels are formed of substantially transparent material which is bubbled or otherwise formed into relatively large substantially uniform volume cells. These are assembled and compressed together to the desired thickness of the panel, thus providing a conglomerate of interlocking polyhedral cells having united outer surfaces or common walls.

It has been found that heat loss through cellular material increases very rapidly as the size of a cell decreases below about a quarter inch minimum distance between cell walls and particularly for cells having less than one-eighth inch between cell walls. This may be due to the fact that for such distances there is a substantial amount of solid material in the small celled material as compared to the solid material in the larger size celled material. The heat loss has been found to diminish very materially with increase in distance between cell walls up to a maximum of about one inch, there being, however, very little appreciable gain where the distance between cell walls increases above three-quarters of an inch, and the best results appear to be in cells having walls of about half-inch spacing. A reason why cells having a wall spacing greater than about three-quarters of an inch do not appreciably increase the heat insulating capacity of the material and, in fact, over one inch decrease its insulating capacity, probably is due to the existence of convection currents in the gas or air within the cells, which aid in transmitting heat through the material. It is desirable, therefore, to have the cell shape and size such that the distance between cell walls preferably is between one-fourth and three-fourths inch. It has been found that a half-inch wall spacing for large celled material provides a very good light and short wave infrared radiation transmitting material having excellent long wave heat insulating properties. Such material has been found to transmit about 70 percent of the light and infrared radiation incident on the surface of a panel made of the material, as it allows the relatively short infrared waves to pass, and it is a good insulating material as it minimizes the retransmittal of the longer wave lengths, including the long wave infrared radiations, and the cells are sufficiently small substantially to prevent setting up convection currents within the cells. Thus, it has an excellent "greenhouse" effect, i.e., it is highly transmissive of solar spectrum energy, which as is well known is mostly confined to the range between 0.3 and 2.0 microns, while substantially preventing the retransmission of infrared of longer wave lengths. For some uses, as where a colored window is desired, a suitable dye or coloring material may be added to the cell producing material or colored skins or sheets may be used.

It is an object of this invention to provide an improved large celled material.

Another object of this invention is to provide an improved cellular panel comprising multiple layers of large cells united so as to transmit light while preventing a direct passage of light and view through the panel, and also providing good short wave infrared radiation transmission and having a good long wave heat insulating properties, i.e., is poorly transmissive of long infrared waves.

Yet another object of this invention is to provide an improved large celled material comprised of substantially hollow tubular cells of transparent material.

Further objects and advantages of this invention will become apparent from the following description referring to the accompanying drawings, and the features of novelty which characterize this invention will be pointed out with particularity in the claims appended to and forming a part of this specification.

In the drawings:

FIGURE 1 is a longitudinal sectional view, partly broken away, through a mold illustrating a multiple layer of rigid thin-walled beads, prior to being compacted and fused together to form an improved multicellular panel;

FIGURE 2 is a longitudinal sectional view, partly broken away, through a mold similar to that shown in FIGURE 1, illustrating the arrangement of the compacted interlocking conglomerate of polyhedral cells formed from an assembly, such as that of FIGURE 1, after having been suitably heat treated and compressed;

FIGURE 3 is a longitudinal sectional view, partly broken away, through a mold similar to that shown in FIGURES 1 and 2, illustrating the arrangement of a multiple layer of rigid thin-walled hollow beads between a skin or thin sheet arranged on each side of the assembly;

FIGURE 4 is a longitudinal sectional view, partly broken away, through a mold of the type shown in FIGURE 3, illustrating the compacted interlocking conglomerate of polyhedral cells between a skin or thin sheet on each side of the assembly after having been heat treated and compressed to the finished panel size;

Figure 10:
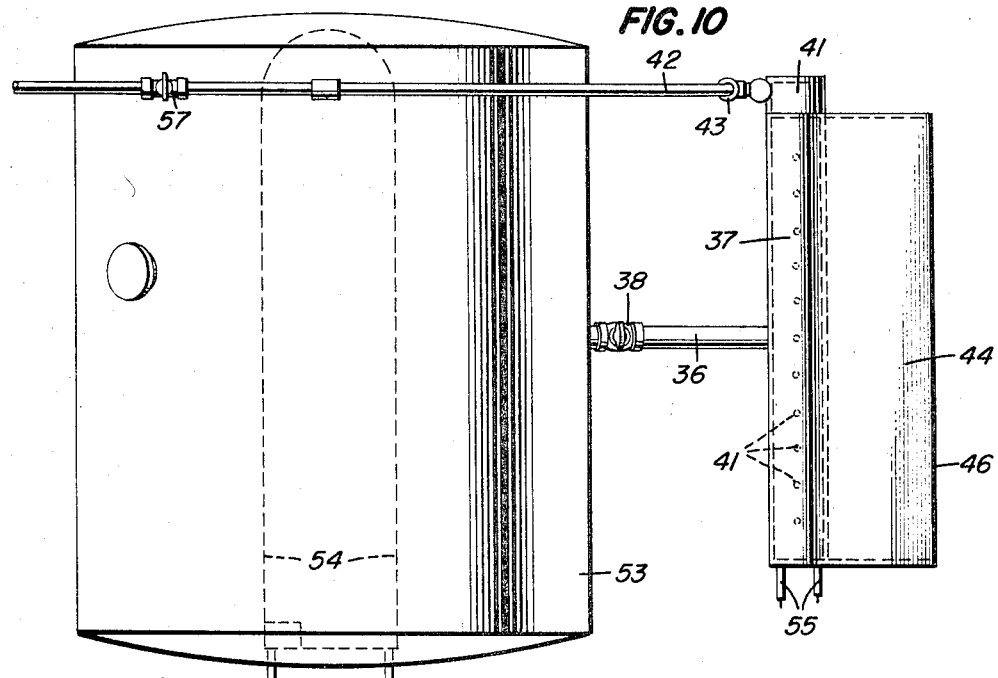
Figure 11:
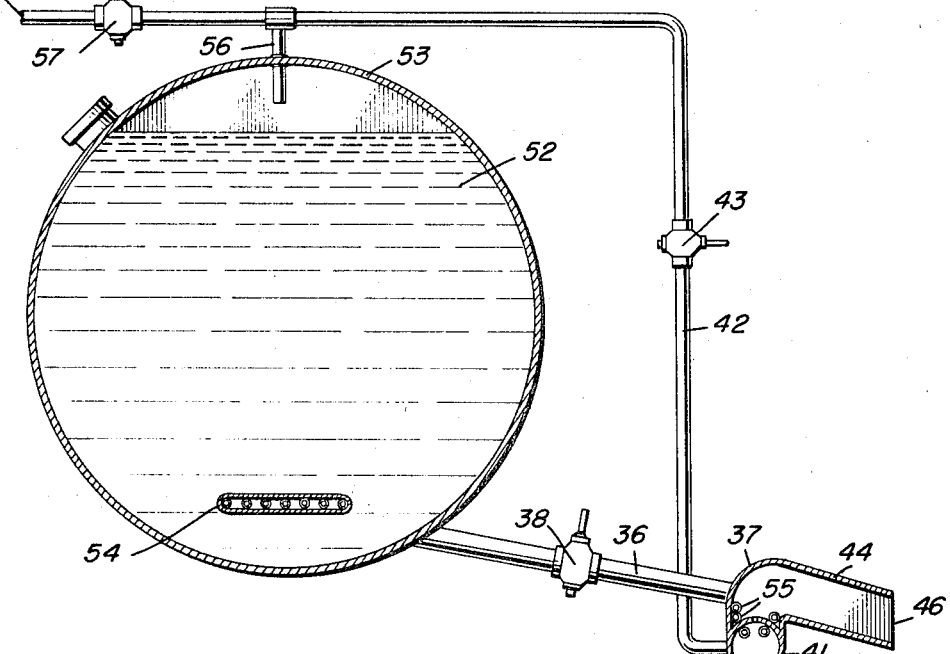
Figure 12:
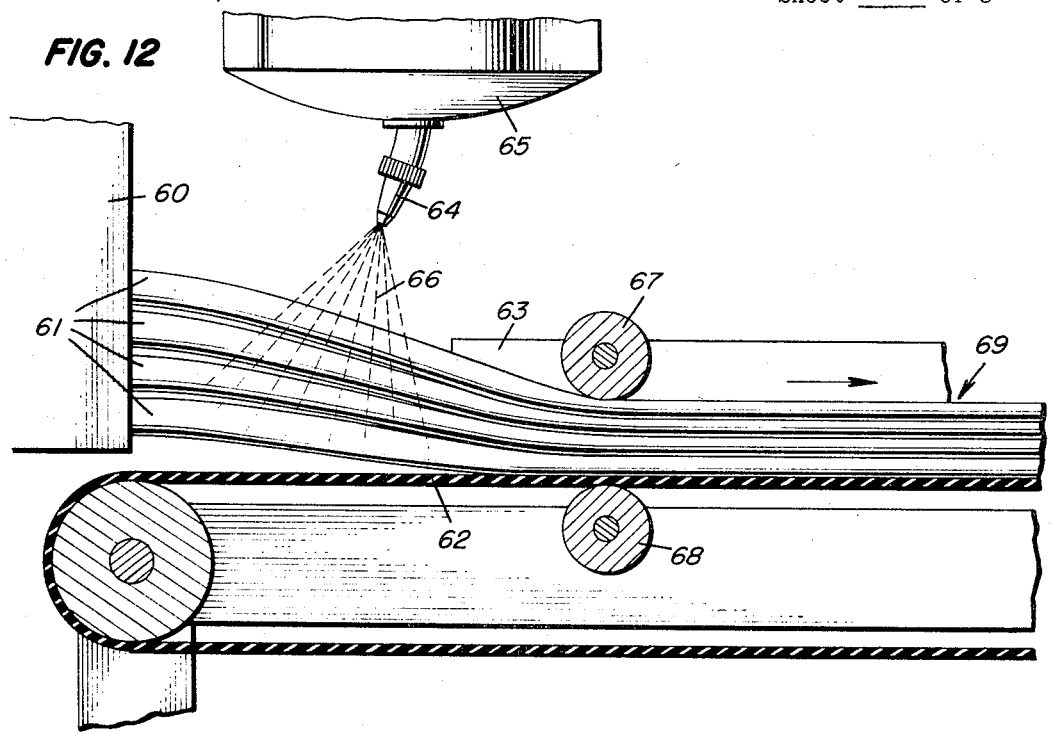
Figure 13:
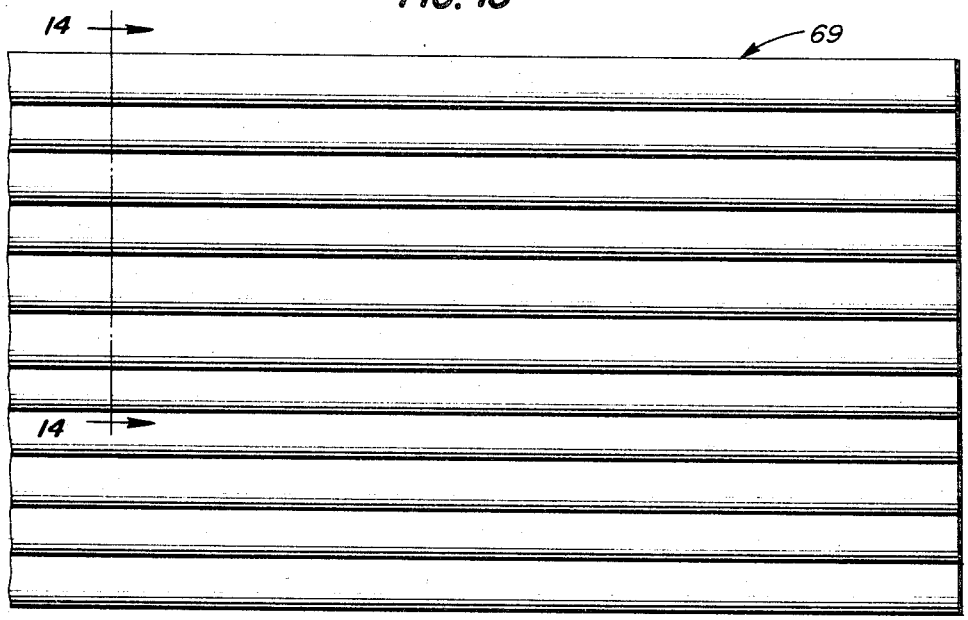
Figure 14:
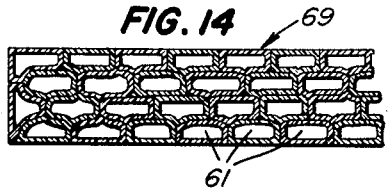

FIGURE 5 schematically illustrates a longitudinal sectional view through an apparatus for continuously producing a multilayer interlocking conglomerate of rigid thin-walled hollow polyhedral cells in the form of a panel by a system which blows or otherwise suitably forms the cells and continuously feeds the bubbled cells to thermal treating and compressing equipment, which forms the loosely arranged assembly of cells or bubbles into a finished compacted panel of predetermined thickness and width;

FIGURE 6 is a transverse sectional view, partly broken away, through a mold similar to that shown in FIGURE 1 wherein a multiple layer of relatively small tubular or hollow needle type cells are assembled with a small amount of gas-liberating material in each cell;

FIGURE 7 is a transverse sectional view, partly broken away, through the mold shown in FIGURE 6, illustrating the cellular panel after having been suitably heat treated so that the gas-liberating material has reacted and expanded the cells into an interlocking conglomerate of thin-walled hollow polyhedrons;

FIGURE 8 is a plan view of apparatus, partly broken away, for forming an interlocking conglomerate of thin-walled hollow polyhedral cells or bubbles and assembling such cells in a suitable mold, similar to the molds shown in FIGURES 1 through 4;

FIGURE 9 is an elevational view, partly broken away and partly in section, of the apparatus shown in FIGURE 8, illustrating the manner in which the cellular material can be evenly distributed in a suitable mold for a substantially continuous operation of the apparatus;

FIGURE 10 is a plan view of a modified type of apparatus, similar to that shown in FIGURES 8 and 9, for forming a desired type of thin-walled cellular material by a bubbling process especially adapted for use where the material is thermoplastic and requires heating in order to maintain a desired fluidity in both the supply chamber and the cell forming bubbler chamber;

FIGURE 11 is an elevational view, partly in section, illustrating the apparatus shown in FIGURE 10, for forming large thin-walled cells with a heated bubbler;

FIGURE 12 is an elevational view, partly broken away and partly in section, illustrating apparatus for forming a multilayer interlocking conglomerate of polyhedral cells in the form of long hollow tubular members by a continuous process from an extrusion device to the finished compacted panel of desired depth and width;

FIGURE 13 is a plan view of an end portion of a panel made by the apparatus shown in FIGURE 12; and FIGURE 14 is a sectional view, taken along line 14—14 of the tubular cell panel shown in FIGURE 13.

Referring to the drawings, FIGURES 1 and 2 illustrate equipment for making an improved solar energy transmitting and heat insulating panel structure in accordance with this invention wherein individually preformed substantially spherical hollow rigid beads are assembled in a mold, as shown in FIGURE 1. These assembled beads then are heat treated and compacted to form the finished cellular panel comprising an interlocking conglomerate of polyhedral cells having fused outer wall surfaces or common walls for adjacent cells.

An important result of practicing this invention is that the material of which the cell walls are made is substantially transparent and has the characteristic of transmitting a large percentage of solar energy, especially light and short wave infrared radiations of wavelengths between approximately 0.3 and 2.0 microns which comprise the major part of the solar spectrum, while absorbing long wave infrared radiations and otherwise minimizing the transmittal of heat through the panel by convection or conduction. Thin films formed of materials having a low index of refraction are especially good for a high degree of solar energy transmission. This is due in large measure to the low reflection loss from the surfaces of such transparent films. A number of materials of this type are available in both organic and inorganic compounds, particularly those containing fluorine, although other substantially transparent materials also can be used if their index of refraction is sufficiently low and they are capable of being formed into sufficiently rigid stable thin films.

Solar energy transmission is influenced by the reflectivity of cell-forming materials, which in turn is a function of their index of refraction. Most glasses have a reflection loss at least 8% per pane of film. This is multiplied by the number of films or cell-walls. Materials with low index of refraction have lower reflectivities and therefore they transmit more solar radiation. Low index of refraction can be obtained in glasses, such as in fluoride glasses. Most glasses are opaque to long wavelength infrared, that is, they show the "greenhouse effect" transmitting solar radiation, but not transmitting heat re-radiation. In addition glasses or other transparent materials can be coated with very thin coatings to obtain low reflectivity.

Most plastics transmit solar radiation nearly to the same extent as glass, because the reflection losses are also nearly the same. Fluorinated plastics are exceptional, because their index of refraction is lower and therefore they transmit as much as 96% solar radiation per film, the balance of 4% is the reflection loss. Most plastics transmit certain bands in the infrared spectrum and some of them are quite transparent in the infrared. The latter include polystyrene, polyethylene, and some others. It is necessary to render these materials opaque to long infrared by mixing them with materials which absorb such long infrared wavelengths. At the same time, these materials preferably have low index of refraction, to help diminishing reflection losses of solar wavelengths. According to this invention, certain inorganic fluorides have been found especially useful for attaining these results.

In practicing the present invention, the materials used preferably are thermoplastic and may include a variety of glasses or glass-like materials, as well as plastics, which may be formed into hollow thin-walled spherical beads. The material of which these beads are made preferably also is transparent, although, if desired, the material may be colored to provide a desired color to the finished panel or the beads may even be made of material which is translucent or opaque. The latter two types of materials would not, of course, have the visible light transmitting qualities of transparent material (i.e., visible wavelengths between 0.4 to 0.75 micron) but might well permit the transmission of a high percentage of short wave infrared radiation in the solar spectrum range (i.e., from 0.75 to 2.0 microns) and could very effectively be used as panels forming light-weight curtain walls having excellent heat insulating properties minimizing the retransmittal of longer wavelength infrared radiations, generally longer than 4 microns.

Numerous glass formulations are suitable for carrying out the present invention, some differing by only slight changes in composition. The best glasses are those which transmit the most solar radiation, a requirement which is influenced by the presence of small amounts of iron compounds, accidentally present as impurities. Typical and well known glass types and their compositions are to be found in any text book on glass, and, for illustrative purposes and in no way limiting the invention thereto, the commercial or window type glass, generally the soda-lime-silica type, composed usually of 70–75% $SiO_2$, 5–10% $CaO$, 1–5% $MgO$, and 13–17% $Na_2O$ and $K_2O$, such as $Na_2SiO_3 \cdot CaSiO_3$ and $Na_2O \cdot CaO \cdot 6SiO_2$, and the chemical ("Pyrex") type glass, generally the borosilicate type, composed usually of 60–80% $SiO_2$, 10–25% $B_2O_3$, 1–4% $Al_2O_2$, and 2–10% $Na_2O$ and $K_2O$. Quartz glass, pure silica, also may be used but is rather expensive for use in the present invention.

Numerous materials known generally as plastics are suitable for making the hollow beads in practicing this invention, and vinylidene fluoride (sold under the trade name "Tedlar") and polyethylene terphthalate resin (such as sold under the trade name "Mylar") are very good well known examples of such suitable materials. Others include polytetrafluoroethylene, polytrifluorochloroethylene, esterified diphenyl carbonate bisphenol A, and a more recent development, tetrafluoroethylene polymers (sold under the trade name of "Teflon TFE") resins.

Any light and short-wavelength infrared transmissive thermoplastic material may be employed, such as resinous materials which for purposes of convenient illustration, without intending to be restricted thereto, may be styrene polymers, as polystyrene, and polymers and copolymers of ar-methyl styrene, or vinyl toluene, the several chloro styrenes (such as mono- and dichloro styrene), ar-dimethyl styrene, ar-ethyl styrene and the like, including the various thermoplastic polymers and copolymers of alpha-methyl styrene. In addition, other well known thermoplastic resinous materials can be employed including those which comprise polymers and copolymers of methyl methacrylate, such as materials sold under the trade names of "Lucite" and "Pontalite" and its homopolymer and the copolymers thereof with vinylidene chloride; thermoplastic polymers and copolymers of vinyl chloride, including homopolymeric vinyl chloride; thermoplastic olefin polymers and copolymers, such as polyethylene, polypropylene, and the like and chlorinated polyolefins, such as chlorinated polyethylene, etc. These plastics may also be selected from thermoplastic ester and ether derivatives of cellulose, including cellulose acetate, cellulose propionate, cellulose acetate butyrate, ethyl cellulose and the like, celluose nitrate and so forth. In many instances, it will be found that the life and durability or permanence of the large celled panel can be greatly improved by forming it with an enclosing sheet or skin of ultraviolet light-absorbing material, such as ordinary glass.

The increased use of glass and similar material in building construction has made the problem of suitable heat insulation a very serious consideration for all such buildings. Glass and similar materials normally are poor heat insulators in thicknesses which are practical for building construction. Double windows in the form of storm windows or permanently sealed structures, having a dead-air space between two panes of glass, are relatively expensive and do not provide insulation comparable to a good insulated wall. Such double-paned structures seldom even provide the insulation obtainable by reasonably good uninsulated wooden frame house walls or 12-inch brick walls. Glass bricks have been used, but these also seldom have better insulating properties than double-paned glass windows with a quarter- to half-inch dead-air spacing between panes. Multiple paned windows have been proposed and used, but the weight and cost of such window structures generally is quite excessive. In addition, sealing of the edges of the panes is very difficult and expensive, yet such sealing is a necessity in order to prevent a progressive accumulation of dust and dirt between the panes.

Experiments have shown that a spacing of more than a half-inch between multiple paned windows does not appreciably increase the insulating properties of such windows, and a spacing of more than an inch actually causes a decrease in the insulating properties of such windows. This decrease in the insulating properties probably is due in large part to convection currents which arise in the air between the panes due to the difference in temperature of the inner and outer panes and sufficient space to allow such currents. It has been found that the heat insulating property of an insulated wooden frame wall or 12-inch brick wall can be substantially duplicated by the use of eight thin glass or glass-like films or panes with a half-inch spacing between panes. Such a window would, of course, be entirely impractical because of its excessive weight and cost.

Substantially the same heat insulating and light and short wave infrared transmission properties are obtainable by the provision of a panel structure comprising an interlocking conglomerate of polyhedral cells of substantially transparent material wherein the walls of the cells are not uniform in size, shape, or angles. Such a finished panel includes a multiple layered assembly which provides for the transmission of light and short wave infrared radiation in the usual range between 0.3 and 2.0 microns, while preventing a direct view through the panel. In addition, it minimizes the retransmission of heat because of an absorption of a large percentage of long wave heat radiation, generally over 2.5 microns, and because of a substantial elimination of convection currents within the panel and a long circuitous path through the solid material forming the walls of the cells, thereby minimizing direct conduction of heat through the panel. The cell walls also should be as thin as possible consistent with adequate strength to support normal pressures which might be encountered by a panel for the purposes desired without collapse of the panel.

A desirable thin-walled multiple layered polyhedron panel can be made by preforming substantially spherical thin-walled rigid hollow beads by any suitable method and assembling such hollow beads in a mold having the size and shape of the desired panel structure. Such a mold preferably is formed of material which does not readily react chemically with the material of which the beads are made and may comprise a stainless steel substantially rectangular body having side walls 1 and a bottom 2, as shown in FIGURES 1 and 2. The inner sides of the mold should be coated with any suitable inert material 3, such as lamp black, or other fine inert powder, which may be applied as a powder or as a wash, to prevent sticking of the beads to the mold. The mold then is filled with the desired number of layers of the rigid hollow beads 4, and these assembled beads then are covered with a suitable weighted plunger 5. It is desirable that the weight on the plunger should be uniformly distributed over its surface area which rests on the beads 4, and this can conveniently be done by simply adding a suitably heavy plate 6 over the plunger 5.

This multiple layered bead assembly then is placed in a heat treating oven so that the material of which the beads 4 are formed reaches a softening temperature, whereupon the weighted plunger 5 compresses the beads so that adjacent walls of the beads adhere to one another and generally fuse and interlock to form a compact conglomerate, as illustrated in FIGURE 2. As shown in this figure, the beads lose their substantially uniform configuration and assume polyhedral shapes 4' having multiple sides generally uneven in dimension and direction. In cases where the beads comprise gelatin cells, the walls of the beads may be softened and made tacky by immersing the assembly, such as that shown in FIGURE 1, in a four percent formaldehyde solution, after which the assembly may be inverted to allow excess formaldehyde solution to drain through cover passages 7 and 8 from between the beads 4. After the soaking and subsequent draining, the mold is again inverted, as shown in FIGURE 1, whereupon the weighted cover plunger 5 compresses the beads as explained with reference to thermoplastic beads and shown in FIGURE 2. The volume of the cells formed by the polyhedrons 4' generally is substantially uniform as most of the cells are formed by the original beads 4. In order to assure this characteristic in the finished panel, the plunger 5 and the plate 6 preferably are formed with a large number of spaced communicating passages 7 and 8, respectively, so that the air in the spaces between the beads 4 can escape while the beads are being compacted in the heat treating oven.

As is shown in FIGURE 2, the finished panel structure is provided with substantially even, smooth, outer panel surfaces in engagement with the sides 1, the bottom 2, and the plunger 5, thus providing a panel having desirably finished surfaces on all sides and edges thereof. The number of layers of beads 4 originally assembled in the mold can be varied to provide the desired thickness and translucence to the panel. In most instances, it is desirable that the compacted panel be cooled slowly in order to minimize the possible setting up of stresses in the cells walls.

As has been pointed out, a number of transparent or translucent metallic fluorides in fine powder form are suitable for use in combination with plastic materials for making thin-walled rigid polyhedral cells which are practical for panel structures. An important feature of these materials is that they should have a relatively low index of refraction to visible light and preferably should be substantially transparent. The following materials have been found to be practical in the formation of panels in according with this invention. $AlF_3 \cdot 3NaF$, $CaF_2$, $MgF_2$, $KBF_4$, and $Na_2SiF_6$. Suitable plastic materials with which these fluorides may be advantageously combined in amounts between 5% and 20% by weight include those non-fluoride plastics previously mentioned.

Calcium fluoride $CaF_2$, magnesium fluoride $MgF_2$ and sodium aluminum fluoride $AlF_3 3NaF$ are insoluble materials, available in the form of fine powders. They advantageously can be mixed in proportions between 5% and 20% by weight with plastic materials or with water soluble film forming materials, such as gelatin, methylcellulose, and the like, and formed into large celled panels.

Potassium fluoborate, $KBF_4$ and sodium fluosilicate, $Na_2SiF_6$ are water-soluble, or can be obtained in the form of fine powders and may profitably be mixed in proportions up to 20% by weight. They can be mixed with water-soluble film-formers, such as gelatin, methylcellulose, and similar materials, and formed into large celled panels by "bubbling" air or gases of lower heat conductivity through them. The walls of the panels must be perforated to permit the evaporation of water, leaving the film-forming material and the solid fluoride incorporated into the cell-walls. $KBF_4$ and $Na_2SiF_6$ also can be mixed with water-insoluble plastic materials, as fine powders, while the material is heated and formed into large celled panels.

It is common practice to add "fillers" to plastic materials to impart to them some desirable properties, such as increased resistance to flammability or simply to decrease the price. The fluorides mentioned above can be regarded as "fillers" added for the dual purpose to stop long infrared re-radiation and to decrease reflectivity. They can also be considered as additives in the same dual sense, because the usual amount is only 5 to 20% of the total dry-weight of the material forming the panel.

The thermal insulating properties of the panels can also be improved by the use of gases other than air within the hollow preformed beads. One such gas which is especially practical is carbon dioxide, as its heat conductivity is only slightly more than one-half that of air and this gas is not noxious to human beings.

The reflection of radiations from the wall surfaces of the polyhedral structures also can be reduced by applying a low reflection coating to these surfaces. A very convenient method of accomplishing this is to add a small percentage of a fluoride to the gas used in making the hollow beads. Only a very small amount of the fluoride is needed because only a very thin layer or coating is necessary to produce the low reflecting surface. Thus, a very small amount of hydrofluoric acid or similar agent added to the gas can form a substantially invisibly thin low-reflection coating or etched inside surface of each of the hollow beads and further decrease the index of refraction of the finished panel.

In certain instances, it may be desirable to provide panels having very smooth even surfaces. This can best be obtained by facing each side of the cellular panel with a relatively thin sheet or skin of even smooth material, such as a thin layer or plate of glass or plastic. Such a structure forms a cored laminate which can be made substantially transparent to light and short wave infrared radiations, with very good thermal insulating properties which minimize the heat loss through the panel. Such a cored laminate also can be used to provide very pleasing esthetic effects by using colored transparent material to form the conglomerate of polyhedral cells comprising the core of the panel and using substantially transparent skins on one or both sides of the panel, or one or both skins can be made of colored material with substantially clear core material. Such colored panels can be used to produce the effect of stained glass windows and can also be used where colored lighting effects are desired.

FIGURES 3 and 4 illustrate apparatus for forming cored laminates of this type having a relatively thin sheet or skin on each side of a cellular filler made from preformed rigid thin-walled hollow beads. In this apparatus, a mold is provided comprising a receptacle having sides 9 and a substantially even smooth bottom 10. As in the arrangement described with reference to FIGURE 1, the sides and bottom of the mold preferably are coated with lamp black 11 or any other suitable inert material to prevent sticking of the material of which the panel is made to the sides and bottom of the mold.

In this arrangement, a thin sheet of skin 12 of suitable substantially transparent material, such as glass, is placed over the bottom 10 of the mold. A multiple layer of rigid thin-walled hollow beads 13 then are placed over the sheet 12 to provide the desired finished thickness of the laminate. Where it is desired to have a very even smooth surface on both sides of the laminate, a thin sheet or skin 12' also is placed over the upper layer of beads 13 and the assembly is covered by a plunger 14 loosely slidably fitted in the top of the mold. The plunger 14 is adapted to compress the hollow beads to the desired panel thickness, and, in order to assure a uniform thickness to the panel, it is desirable that pressure by the plunger upon the material in the mold should be distributed substantially uniformly over the surface of the upper skin 12'. This can conveniently be provided for by placing a suitably heavy plate 15 over the plunger 14, which will weight the plunger substantially uniformly. This heavy plate 15 also should have a small working clearance with the sides 9 of the mold to allow for free movement of the plunger and plate within the mold.

In order to form the assembly of thin walled hollow beads and skins into an interlocking conglomerate of polyhedral cells having sides of unequal dimensions extending at various angles, the assembly in the mold is placed in a heat treating oven so that the material of which the beads 13 and the skins 12 and 12' are formed will be softened, whereupon the weighted plunger 14 compresses the beads 13. As the softened beads 13 are compressed, adjacent walls of the beads adhere to one another and generally fuse and interlock to form a compact cellular conglomerate core which also is adhered to the inner sides of the skins 12 and 12' by fusion therewith. This arrangement is best illustrated in FIGURE 4. Since most of the polyhedral cells will be formed by the substantially uniform beads 13, the volume of most of the resulting polyhedral cells 13' will be substantially equal. With this arrangement, the upper skin 12' is imperforate, so air in the spaces between the cells 13, FIGURE 3, cannot escape through the plunger 14 and plate 15, and, unless such air is evacuated or allowed to escape from between the skins 12 and 12' very little compression of the core material can result. In order to facilitate the removal of the air from between the hollow beads 13 during the compressing of these beads in the heat treating oven, the sides 9 of the mold preferably are formed with a plurality of vents 16, through which air can escape from within the mold. With this arrangement it is particularly desirable that the compacted panel be cooled slowly in order to avoid setting up stresses in the walls of the polyhedral cells 13' and the skins 12 and 12', and to maintain a completely cohered assembly.

As in the arrangement described with reference to FIGURES 1 and 2, the number of layers of hollow beads 13 can be varied to obtain the desired thickness and translucence of the finished cored laminate or panel. The various features described with reference to FIGURES 1 and 2 regarding the materials which may be used for forming a cellular panel of an interlocking conglomerate of polyhedral cells to provide various characteristics thereto are equally applicable to cellular panels made with the apparatus shown in FIGURES 3 and 4.

In accordance with another embodiment of this invention, a fully fused interlocking conglomerate panel of polyhedral cells can be made by a continuous process in which the cells are formed and continuously fed to heat treating and compacting apparatus. FIGURE 5 schematically illustrates this type of apparatus.

In a continuous process such as that illustrated in FIGURE 5, thin-walled hollow polyhedrons or bubbles 17 may be formed in any suitable manner, as by being blown from orifices of a suitable bubbling device 18. The bubbles 17 are conveniently conducted directly from the orifices of the bubbler 18 through a supply chamber or nozzle 19 into a heat treating and compacting chamber. This chamber preferably is formed with converging walls 20 which are heated in any suitable manner, as by electric heating elements 21.

With such an arrangement it is necessary that the material of which the bubbles 17 are made be in the fluid or plastic condition in the bubbler, so that the bubbles can readily be blown by air or any other suitable gas, and the conglomerate of bubbles 17 can then flow freely through the supply nozzle 18 into the heat treating chamber. The heating elements 21 are preferably arranged so that the temperature of the heat treating chamber or oven is hottest at the end of the chamber to which the bubbles 17 are supplied and progressively decreases toward the opposite end of the chamber, so that the material of which the bubbles are formed tends to solidify and the bubbles take the shape of substantially rigid thin-walled cells as they progress through the chamber. Adjacent cells in such a structure have common walls, so that there is no problem presented in this process to assure a thorough adhesion of all of the cells into a fully interlocked cohesive mass. It is desirable, however, to provide for the gradual decrease in temperature in the heat treating chamber from the supply end to the exhaust end in order gradually to solidify the material as it passes through the chamber so as to avoid setting up stresses in the walls of the cells.

In order to assure a uniform thickness to panels made with this type of apparatus, a pair of rolls 22 and 23 is arranged closely adjacent to and respectively above and below the exhaust end of the heat treating chamber, so as to compact the cellular conglomerate as it passes from the heat treating chamber. Rotation of the rolls as shown in FIGURE 5 also provides for continuously drawing the cellular conglomerate out of the heat treating chamber and continuously driving it on to a receiving table 24 from which it can be cut into any desired lengths.

The bubbler equipment 18, delivery nozzle 19, and heat treating chamber all are formed with suitable side walls to provide a finished cellular panel 25 having a desired uniform width. Since the material of which the cells of the panel 25 are formed has solidified by the time it reaches the receiving table 24, it is not necessary to provide continuous walls for the entire length of the table 24; however, it is desirable to have at least short guide walls 26 on the sides of the receiving table 24 adjacent to the compacting rolls 22 and 23 in order to assure properly feeding the panel 25 lengthwise on to the receiving table 24.

The material for forming the thin-walled polyhedral cells 17 may comprise any suitable glass or glass-like material which can be plasticized by heat in the bubbler which forms the cells, and may even comprise other suitable rigid cell forming materials, such as gelatine and other materials of which examples previously have been given. It has been found that very good large celled panels may be formed from material comprising a composition of polymerized trifluorochloroethylene. Other good materials may comprise a composition of 6 to 12 percent gelatine, 0.05 to 0.2 percent foaming agent, a strengthening additive, e.g., 3 to 5 percent of a 37 percent solution of formaldehyde, 0 to 20 percent of a 2 percent water solution of methylated cellulose, and the remainder water. The foaming agent in such a material may comprise various agents, such as a petroleum sulfonate, various water soluble soaps, such as metallic stearates or metallic sulfonates, sodium alkyl aryl sulfonate, and dioctyl sodium sulfosuccinate dissolved in water. In some instances, it also may be found desirable to add to the gelatinuous material of which the cells are to be formed, up to 10 percent of a 10 percent solution of diethanol amine derivatives. Another additive which has been found to be particularly useful in increasing the strength of the cell walls is octakis (2-hydroxy propyl) sucrose. A type of additive which also has been found to be useful in strengthening a gelatine type material is methylcellulose. Up to 5 percent of polyvinyl alcohol also can be used as an additive to increase the strength of the cell walls and has been found particularly good where the panel is to be used for outdoor exposure. Certain types of glycerine in small percentages up to 5 percent have been found to give good results by increasing the stickiness of the bubble material.

Following the procedure of the present invention good bubbles of excellent durability were obtained employing commercial sodium silicate (water glass), 75 cc. and 25 cc. of Quillaya extract. The bubbles were formed by introducing $CO_2$ under pressure through a glass tube. Bubbles of excellent durability were also obtained employing the water glass and Quillaya extract in 50:50 and 60:40 ratios, and employing a mixture of nitrogen and $CO_2$ as the gas. Closed cell structures are formed by assembling the bubbles and compressing together to the desired thickness of the panel, thus providing a conglomerate of interlocking polyhedral cells having united outer surfaces or common walls.

Closed cell structures were made by packing hollow glass spheres into stainless steel molds coated on the inside with graphite to prevent sticking. The mold was closed on top with a graphite coated tightly fitting plunger which was uniformly loaded with weights. The packed mold was placed in an oven and heated slowly and evenly to the softening temperature of glass. The glass spheres were pressed together and they interlocked, forming closed-cell polyhedric panels.

In other experiments a mixture of 8 grams gelatin, 180 cc. water, 20 cc. of 2% Aerosol OT, 20 cc. of glycerine and 20 cc. of formaldehyde was prepared by dissolving the gelatin in water, raising the temperature to 45° C. and adding the aerosol and glycerine after which the formaldehyde was added. Compressed nitrogen was bubbled through this feedstock and the resulting bubbles were encased in a frame 12" x 12" x 4" deep. The frame was covered with glass plates and sealed with tape. There were 8 to 10 rows of bubbles ranging in size from ¼ inch to 1 inch in diameter. The solar energy transmission was 54%.

In still other experiments panels were made of bubbles formed from a solution of 48% sucrose and 2% Aerosol OT in water. It was found that 4 layers of bubbles about ¾ inch in diameter transmitted 73% of the normally incident solar energy. Six layers of bubbles of about ½ inch in diameter transmitted 69% while 8 layers of bubbles of about 0.35 inch transmitted 60%.

In some instances, it may be found desirable to add to the cell making material fillers which are relatively cheap and extend the volume of the material without diminishing its desirable properties. Such filler materials should be in the form of very fine powder which is inert relative to the basic cell wall-making material so that they will not interfere with the formation of the thin walls of which the bubbles or cells are made. This fine powder preferably is an inorganic material and, as an example, may comprise up to 4 percent of an aluminum powder, which normally is in the form of minutely fine flakes. It also may comprise up to 20 percent of very finely powdered calcium carbonate.

Various thermoplastic materials may be found to be suitably fluid for the formation of bubbles without the addition of solvents or foaming agents and, where such is the case, the thermoplastic material need only be heated to the desired temperature to maintain its fluidity until the bubbled material or foam is delivered to the forming apparatus, which may comprise the heat treating chamber and rolls of apparatus, such as that shown in FIGURE 5, or may comprise suitable molds, such as those shown in FIGURES 1 through 4. All of the various modifications for providing specific characteristics to the finished cellular panels, as described with reference to the apparatus shown in FIGURES 1 through 4, can also be utilized in making the cellular panels using the equipment schematically illustrated in FIGURE 5.

In accordance with another embodiment of the present invention, large celled thin-walled interlocking polyhedrons may be made from relatively small tubular or hollow needle elements or beads 27 of thermoplastic transparent material, such as previously mentioned, by inserting into each bead a small amount of material 28 capable of liberating gas on being heated, such as ammonium carbonate or ammonium chloride. The beads are sealed after the gas liberating material has been inserted therein, and a multiple layer of these hollow bead elements are assembled in a suitable mold 29 to any desired thickness, as shown in FIGURE 6. As in the arrangements described with reference to FIGURES 1 to 4, the inner surfaces of the mold 29 preferably are coated with an inert material 30, such as lamp black, to prevent sticking of the bead elements to the sides of the mold.

As in the arrangement shown in FIGURES 1 through 4, the hollow elements 27 may be placed in the mold directly in contact with the bottom 31 of the mold, or a thin skin or sheet of transparent, even smooth material may first be placed over the bottom of the mold, as in the arrangement illustrated in FIGURES 3 and 4. A suitable plunger 32 is arranged over the assembly of hollow bead elements 27, and a heavy plate 33 is placed over the plunger 32 so as to distribute the weight of the plate 33 evenly over the plunger and provide an evenly distributed compressive force over all of the assembled elements 27. The plunger 32 and the plate 33 are of a size to provide a free sliding clearance with the inner sides of the mold 29.

This assembly of elements in the mold 29 then is placed in a suitable heat treating oven, and the temperature of the assembly is raised so that the gas liberating material 28 will decompose and liberate gas which will expand the hollow elements 27 into thin-walled polyhedrons 34, as shown in FIGURE 7. This heat treatment is continued until the walls of the cells have thoroughly united or fused to form a completely interlocking conglomerate of polyhedral cells with cell walls of various sizes extending in many different directions. This forms a cellular panel having a much larger volume than the original assembly, as can be seen by comparison of FIGURES 6 and 7, and forms a finished large celled panel having substantially even smooth outer panel surfaces. The various treatments and modifications as explained with reference to the preceding embodiments of this invention can also be incorporated in the manufacture of the large celled panels using the equipment of FIGURES 6 and 7 to provide the characteristics obtainable by such additions and modifications.

FIGURES 8 and 9 illustrate an improved type of bubbler which may be associated with a continuous process using equipment such as that shown in FIGURE 5, or for making a bubbled conglomerate which can be assembled in molds of the type shown in FIGURES 1 through 4. In the illustrated arrangement, the bubble forming material is prepared or collected in a suitable chamber or reservoir 35 from which it is supplied through a conduit 36 to a material receiving chamber 37 of an improved type of bubbler. A suitable valve 38 is provided between the reservoir 35 and the material receiving chamber 37 so as to regulate the flow of material into the receiving chamber, whereby the amount of material in this chamber can be kept at a predetermined level.

As is more clearly shown in FIGURE 8, the material receiving chamber 37 extends transversely of the equipment to a width corresponding to the desired width of a finished panel, that is, substantially equal to the width of a bubble receiving mold 39. Bubbles of a desired size having a desired thickness of wall material are adapted to be blown by passing air or a suitable gas through a plurality of orifices 40 spaced transversely along the length of a transversely extending blowing tube 41, which is arranged in the lower portion of the material receiving chamber 37. The gas for blowing the bubbles is supplied to the blowing tube 41 from any suitable source through a conduit 42.

It has been found that the size of the bubbles and the thickness of the material forming the walls of the bubbles can be regulated to predetermined values by controlling the depth of the material in the bubbler above the orifices 40, by making the orifices 40 of a predetermined size, and by regulating the pressure of the gas used in blowing the bubbles. A suitable valve 43 is arranged in the conduit 42 so as to regulate the pressure of the gas supplied to the blowing tube 41. It also has been found that the size of the bubbles vary with the density of the liquid from which the bubbles are made and the surface tension of the liquid. The size of the bubbles also depends upon whether the material forming the bubbles is of a type which wets the blowing orifice material and whether the orifices are vertical or extend at an angle. By careful controls of all of these various factors, it is possible to obtain the most desirable size of bubbles, which, as has been previously stated, preferably is a bubble having a diameter of from one-quarter to three-quarters inch, and most preferably one-half inch in diameter.

In some instances, the material used in making the bubbles will carry a certain amount of surplus unbubbled liquid with the bubbles as they pass away from the bubbling orifices 40. It is desirable that this unbubbled material should be drained from the interlocking cellular conglomerate formed by the bubbles before they are assembled for heat treatment and compression into finished panels. A bubble gathering transversely extending nozzle 44 is provided, which extends away from the material receiving chamber adjacent to the bubbling tube 41. The lower side 44' of the nozzle 44 is perforated with a plurality of transversely and longitudinally spaced drainage slots 45 through which the surplus unbubbled material can be drained from the bubbled conglomerate as it passes from the chamber 37 to the outlet end 46 of the nozzle 44. Surplus material which is drained through the slots 45 is gathered by a suitable drainboard 47 and conducted to a sump 48, from which it can be suitably disposed by return to the reservoir 35, or in any other desired manner.

In the illustrated arrangement, the molds 39 preferably are supported on a traveling conveyor belt 49 supported on rollers 50. By controlling the speed of the conveyor belt 49 and moving it in a direction as indicated by arrow 51, FIGURE 9, the depth of bubbled material delivered to each mold 39 can be evenly regulated. Each mold 39, which has been filled to the desired depth, can be transferred by the conveyor belt 49 away from the bubbling equipment, so that a weighted plunger can be put over the bubbles collected in the mold 39, after which the entire assembly can be transferred to a suitable heat treating oven for completion of the process, as has been described with reference to the apparatus shown in FIGURES 1 through 4. If desired, suitable thin sheets or skins may be placed on one or both sides of the interlocking cellular conglomerate in the molds 39, in a manner similar to that described with reference to FIGURES 3 and 4.

For certain types of thermoplastic material which are used in manufacturing cellular conglomerate for making large cell panels in accordance with the present invention, modifications of the apparatus shown in FIGURES 8 and 9 may be desirable in order to maintain the material at a bubble forming fluidity. Such modifications are illustrated in FIGURES 10 and 11, and include means for heating the material 52 in the preparing chamber or reservoir 53. Any suitable heater, such as a thermostatically controlled immersion heater 54, may be arranged to maintain the temperature of the material 52 at the desired value. Material from the reservoir 53 is adapted to be supplied to the material receiving chamber 37 of the bubbler through the conduit 36, and, as in the apparatus shown in FIGURE 9, the level of the material in the chamber 37 can be maintained at a desired depth by controlling the flow through the conduit 36 by a suitable valve 38. In most instances, it will be found desirable also to provide the bubbler with a suitable heater, such as a thermostatically controlled immersion heater 55, arranged within and around the material receiving chamber 37 and the bubbler tube 41, so that the material from which the bubbles are being formed will be maintained at a temperature which will keep material in the bubbler at a desired fluidity to form bubbles of a predetermined desirable size.

The remainder of the apparatus shown in FIGURES 10 and 11 is essentially the same as that shown in FIGURES 8 and 9. If desired, the reservoir 53 also may be pressurized by connecting it to the source of gas pressure through a conduit 53, and a master valve 57 may be provided for regulating the pressure of the gas supplied from the source of gas pressure. When a bubbler of the type shown in FIGURES 8 and 9, or of the type shown in FIGURES 10 and 11, is used for forming bubbles of material, such as glass, which does not utilize a solvent, the lower side 41 of the nozzle 44 preferably is made imperforate and no drainboard 47 or sump 48 need be utilized.

Large thin-walled cells in the shape of hollow tubes also can be used to provide esthetically pleasing panels for the formation of curtain walls. Such tubular celled panels may be made in molds of the type illustrated in FIGURES 1 through 4, in which the large cells comprise inflated tubes which are sealed at both ends and extend substantially the full length of the molds. The manufacture of such curtain wall panels can be expedited by producing the panel material by a continuous process, which also has the advantage of providing for the manufacture of panels of any desired length. FIGURES 12, 13 and 14 illustrate apparatus for the continuous manufacture of such large celled tubular panel structures and sections of such panels.

As shown in FIGURE 12, the apparatus for manufacturing tubular large celled panels may comprise any suitable extruding equipment 60 which is adapted to form a number of hollow tubes 61 transversely adjacent to one another and also to extrude a multiple layer depth of such transversely adjacent tubes 61 through suitably transversely and vertically spaced extrusion openings. These tubes are sealed at the ends thereof immediately as they begin to pass from the extruding equipment 60, so that a suitable gas, such as air or carbon dioxide, may be blown into the hollow tube 61 as they pass from the extrusion equipment.

A suitable traveling conveyor belt 62 is arranged under the extrusion equipment 60, so that the tubes 61 will automatically assemble on the belt 62 in the predetermined desired number of layers as formed by the extruding equipment, and sides 63 are arranged adjacent to the conveyor belt 62 to hold the extruded tubular cells in assembled relationship on the belt 62. Any suitable material of the type described with reference to the other apparatus for forming cellular panels may be used for the formation of the tubular cells 61.

In some instances, it will be found desirable to coat the outer surfaces of the tube 61 with a thin coating of a transparent adhesive, such as water glass. Such material can conveniently be sprayed upon the tube 61 immediately as they pass from the extrusion equipment 60 by a suitable spray nozzle 64 which supplies the adhesive from a pressurized tank or reservoir 65. In this manner, a thin spray 66 of clear adhesive is applied over all the surfaces of the tubes 61 as they pass from the extrusion equipment to the belt 62.

A short distance from the place where the tubes are sprayed with the adhesive, the tubes are compressed into a compact adherent panel 69 by a pair of rolls 67 and 68. The pressure of the gas within the tubes 61 prevents the collapse of the tubes as they are compacted by the rolls 67 and 68 and provides for a good adherence of the surface of the tubes to one another into a conglomerated unit, as illustrated in the sectional view shown in FIGURE 14. In this manner, the voids between the tubes are substantially eliminated and the walls of the tubes are united to provide a substantially uniform large celled polyhedral structure having substantially smooth outer panel surfaces. The various modifications which have been previously explained with reference to the other embodiments of this invention can also be utilized for obtaining the same characteristics in the tubular celled panels if desired.

I claim:

1. A cellular panel comprising multiple layers of compacted hollow light transmitting cells having common walls and united outer surfaces and having substantially smooth outer panel surfaces, each of said cells having a volume of substantially that of a one-half inch diameter sphere, said cells being formed of material of substantially uniform constituency which in said panel structure provides said panel with the characteristic of being highly transmissive of solar infrared waves and a good insulator of longer infrared waves.

2. A cellular panel comprising an interlocking compacted conglomerate of polyhedral hollow cells of thermoplastic material having common walls and united outer surfaces and having substantially smooth outer panel surfaces, each of said cells having a volume of substantially that of a one-half inch diameter sphere, said cell material having physical characteristics such that in said panel structure a panel is provided having the characteristic of being highly transmissive of solar infrared waves and a good insulator of longer infrared waves.

3. A cellular panel as set forth in claim 2 wherein the walls of said cells comprise a polymer of trifluorochloroethylene.

4. A cellular panel comprising an interlocking compacted conglomerate of hollow polyhedral cells of solar energy radiation transmitting material having common walls and having substantially smooth outer panel surfaces, said cells having a volume of a sphere having a diameter between one-fourth and three-fourths inch, and said cell material in said panel structure providing a panel having the characteristic of being highly transmissive of solar infrared waves and a good insulator of longer infrared waves.

5. A panel as set forth in claim 4 wherein said cell material is colored.

6. A panel as set forth in claim 4 wherein said cell consists essentially of material selected from the group consisting of water glass and glass.

7. A panel as set forth in claim 6 wherein said glass is substantially free of iron compounds.

8. A panel as set forth in claim 4 wherein said cell material comprises a thermoplastic resinous material.

9. A panel as set forth in claim 8 wherein said cell material contains a material selected from the group consisting of $CaF_2$, $MgF_2$, $KBF_4$, $Na_2SiF_6$ and $AlF_3 \cdot 3NaF$.

10. A cellular panel comprising an interlocking conglomerate of polyhedral cells of transparent material having common walls and compacted to provide substantially smooth outer panel surfaces, said cells having a volume of a sphere having a diameter between one-fourth and three-fourths inch, wherein said transparent material is the product formed of 6 to 12 percent gelatin, 0.05 to 0.2 percent foaming agent, a strengthening additive, 3 to 5 percent of 37 percent solution of formaldehyde, 0 to 20 percent of a 2 percent water solution of methylcellulose, and the remainder water.

11. A panel as set forth in claim 10 wherein said additive comprises a diethanol amine derivative.

12. A panel as set forth in claim 10 wherein said foaming agent is dioctyl sodium sulfosuccinate dissolved in water.

13. A panel as set forth in claim 10 wherein said foaming agent is a petroleum sulfonate.

14. A panel as set forth in claim 10 wherein said foaming agent is sodium alkyl aryl sulfonate.

15. A panel as set forth in claim 10 wherein said additive comprises polyvinyl alcohol.

16. A panel as set forth in claim 10 wherein up to 10 percent of a 10 percent solution of a diethanol amine derivative was included as said strengthening additive.

17. A panel as set forth in claim 16 wherein said strengthening additive is octakis(2-hydroxy propyl)sucrose.

18. A panel as set forth in claim 10 wherein said foaming agent is a water soluble soap.

19. A panel as set forth in claim 18 wherein said soap is a metallic stearate.

20. A panel as set forth in claim 18 wherein said soap is a metallic sulfonate.

21. A panel as set forth in claim 10 wherein a fine filler comprising up to 20 percent of fine inorganic inert powder is included in the material of which the panel is formed.

22. A panel as set forth in claim 21 wherein said filler comprises up to 4 percent of fine flake aluminum.

23. A panel as set forth in claim 21 wherein said filler comprises up to 20 percent calcium carbonate.

24. A cored laminate comprising spaced rigid relatively thin skins of transparent material, a plurality of layers of relatively large rigid thin-walled hollow beads of transparent material having a volume of spheres having diameters ranging from ¼ inch to ¾ inch and substantially completely filling the space between said skins, and the sides of said beads being adhered to each other and to said skins forming a completely filled rigid cored laminate, said bead material in said panel structure providing said panel with the characteristic of being highly transmissive of solar infrared waves and a good insulator of longer infrared waves.

25. A cored laminate as set forth in claim 24 wherein said skins are formed of glass.

26. A cored laminate as set forth in claim 25 wherein said hollow beads are formed of glass.

27. A panel structure comprised of rigid compacted thin-walled hollow beads of transparent material having a volume substantially that of a ½ inch diameter sphere and having outer surfaces fused together, and the inner surface of each bead being formed as a low-reflecting surface, said bead material in said panel structure providing said panel with the characteristic of being highly transmissive of solar infrared waves and a good insulator of longer infrared waves.

28. A panel structure as set forth inclaim 27 wherein said transparent material consists essentially of glass.

29. A cored laminate comprising spaced rigid sheets of material substantially transparent to light and shortwave infrared radiations, rigid thin-walled hollow beads of transparent material having a volume substantially that of ½ inch diameter sphere substantially completely filling the space between said sheets, the sides of said beads being adhered to each other and to said sheet's forming a completely filled rigid cored laminate, and said beads being colored to provide a desired colored translucent laminate, said bead material in said panel structure providing said panel with the characteristic of being highly transmissive of solar infrared waves and a good insulator of longer infrared waves.

30. A panel structure comprising a multiple layer of compacted rigid thin-walled hollow cells of material substantially transparent to light and shortwave infrared radiations having a volume of spheres having diameters ranging from ¼ inch to ¾ inch and having fused together cell walls and having substantially smooth outer panel surfaces, said cells being colored to provide a desired colored panel with the inner surface of each cell formed as a low-reflecting surface, and the space within a substantial part of said cells being filled with carbon dioxide, said cells being formed of material which in said panel structure provides said panel with the characteristic of being highly transmissive of solar infrared waves and a good insulator of longer infrared waves.

31. A panel as set forth in claim 30 wherein said transparent material consists essentially of glass.

References Cited

UNITED STATES PATENTS

| | | | |
|---|---|---|---|
| 948,541 | 2/1910 | Coleman | 181—33.1 |
| 946,773 | 1/1910 | Coleman | 181—33.1 |
| 2,282,421 | 5/1942 | Luby | 161—68 |
| 2,369,006 | 2/1945 | Banks | 161—68 XR |
| 2,767,436 | 10/1956 | Noland et al. | 264—321 |
| 2,806,509 | 7/1957 | Bozzacco et al. | 161—161 |
| 2,928,456 | 3/1960 | Potchen et al. | 161—160 XR |
| 2,959,508 | 11/1960 | Graham et al. | 161—43 |
| 2,996,419 | 8/1961 | Schmick | 161—139 |
| 3,177,109 | 4/1965 | Ziegler | 161—161 |
| 3,350,823 | 11/1967 | Murray | 52—200 |

ROBERT F. BURNETT, *Primary Examiner.*

R. H. CRISS, *Assistant Examiner.*

U.S. Cl. X.R.

161—139, 161, 162, 168, 408; 52—200